Feb. 24, 1959 L. J. BRANCATO 2,874,741
COIL SPRING LOCKING INSERT HAVING CHORDAL LOCKING
MEANS AND BITING CORNER RETAINING MEANS
Filed Nov. 28, 1955
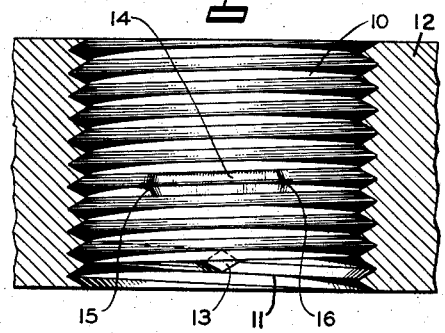
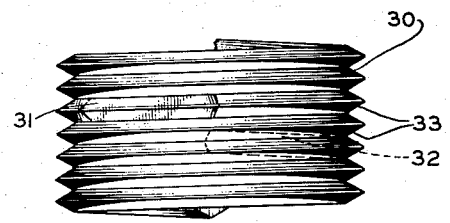
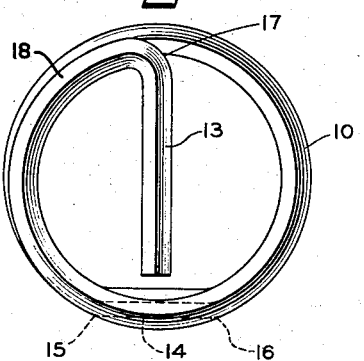
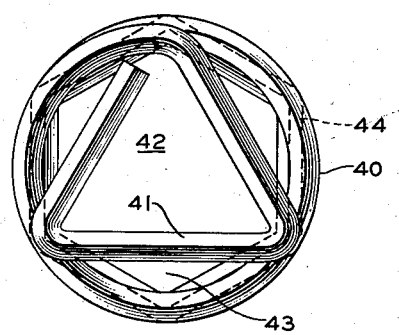
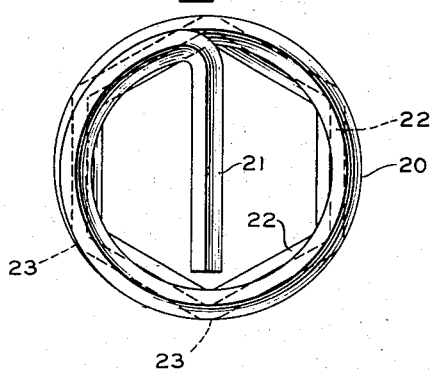
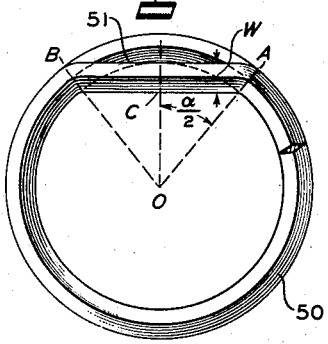
INVENTOR.
LEO J. BRANCATO
BY
ATTORNEY United States Patent Office
2,874,741
Patented Feb. 24, 1959

2,874,741

COIL SPRING LOCKING INSERT HAVING CHORDAL LOCKING MEANS AND BITING CORNER RETAINING MEANS

Leo J. Brancato, Danbury, Conn., assignor to Heli-Coil Corporation, Danbury, Conn., a corporation of Delaware Application November 28, 1955, Serial No. 549,362

2 Claims. (Cl. 151—14)

The invention relates to a self-locking wire coil screw thread insert, and more specifically to an insert in which a portion intermediate the coil ends includes, in its plan view, an area smaller than the remainder of the insert for the purpose of causing such portion to exert a grip on a bolt screwed into the coil after its insertion into the tapped hole of a boss or nut member.

The conventional screw thread wire inserts designed for the indicated purpose are not satisfactory. In the one form of such inserts it is necessary to cause a deformation of the tapped member in a predetermined zone after the insertion of the coil, wherefore such inserts, if otherwise useful, are applicable to nuts only to the exclusion of any boss, where the required deformation cannot be had. In another well-known form, the insert has, intermediate the ends of the coil, a portion of a diameter reduced as compared with the main part of the coil. This form practically cannot be used as it has no means whereby it can be readily inserted into a tapped hole if the main part is somewhat oversized, and because, when it is inserted in a more or less complicated manner, a bolt screwed into it and starting to bear on the first one of the reduced convolutions, will push the first and the adjoining convolutions out of pitch and cross the threads, as the reduced convolutions are to a degree freely movable in the axial direction of the inserted coil.

The invention aims to avoid the drawbacks of the conventional devices and to provide a self-locking wire coil screw thread insert which can be introduced without difficulty into a tapped hole of corresponding diameter in a nut or boss member and which, after its insertion, does not require any additional reforming operation of the locking portion.

The invention further aims to provide a self-locking screw thread insert formed of a wire helically wound in the shape of a cylindrical coil which has intermediate its ends, at least one portion extending between the adjacent convolutions substantially as a chord of the helix.

The invention further aims to provide an insert of the mentioned type which has, intermediate its ends, a portion of a chordal or angular rather than circular configuration extending through any desired or required length of between part of a convolution and several convolutions.

Another object of the invention aims to produce a self-locking insert of the mentioned type wherein the corners of the said portion can be firmly located within the thread groove of the tapped hole, thereby preventing a crossing of the inner coil thread by a bolt screwed into it.

Further objects and details of the invention will be apparent from the description given hereinafter and the accompanying drawing illustrating an embodiment thereof by way of example. In the drawing:

Fig. 1 is a side elevation of an insert according to the invention inserted in a boss member, Fig. 2 is a bottom plan view of the insert, Fig. 3 is a bottom plan view of a modified insert, Fig. 4 is a side elevation of another modification, Fig. 5 is a bottom plan view of a third modification, and Fig. 6 is a diagram illustrating certain formulae for computing the proper corner angle of the mentioned chordal or angular configuration of standardized inserts.

Referring now to the drawing, all the inserts shown are coiled from a wire of substantially diamond-shaped cross-section. This wire cross-section has been found to be best suited to the purpose particularly if, as in the illustrated embodiments, the cross-section of the coiled wire is so located that its longer axis intersects the axis of the coil.

In Fig. 1 a coiled insert 10 is shown screwed in the tapped hole 11 of a boss member 12, which is omitted in the bottom plan view of the insert shown in Fig. 2.

The diameter of the free insert, in its original state, is slightly larger than the diameter of the tapped hole 11. This is a necessary feature of the insert according to the invention in order to ensure a firm frictional seat of the insert in the thread groove of the tapped hole. In order to render it possible to screw the insert into the boss, a diametrical tang 13 is provided at that end of the insert which is leading during the insertion. Of course, the insert end may have any other suitable and conventional form which may be gripped from the interior in order to contract the wire convolutions during the insertion. In order to render the insert self-locking, at least one portion of a convolution is straight so as to form a chord of the helix of the coiled wire. This is shown in Figs. 1 and 2 where the chord 14 extends between the points 15 and 16. It is essential that these points 15 and 16 are located on the outer diameter of the cylindrical insert. This is clearly different from the formation of the tang 13, the root or corner 17 of which is joined to a convolution arc 18 of a progressively reduced radius.

I have found it desirable to position the chord portion a sufficient distance, e. g., approximately three circular convolutions from the tang or other grip forming end convolution, so that in a blind hole the bolt will penetrate sufficiently to fully engage the chorded convolution without having the end of the bolt interfere with the tang or the other grip end of the insert.

The chord portion 14 has the effect that it will bear with highly increased friction against a bolt screwed into the insert, thereby tending, depending on the direction of a torque acting on the bolt, to contract the upper or lower portion of the insert on the bolt, and to expand the other insert portion so as to wedge it still more firmly in the thread groove of the tapped hole which is lined by the insert. The so created locking effect of a single chord, as shown in Figs. 1 and 2, is sufficient especially if low torques are encountered.

As it will be explained hereinafter, this effect cannot be increased beyond a certain magnitude by increasing the length of the chord. However, by multiplying the number of chords applied in an insert, higher torques can be taken up. Such greater number of chords may be either adjacent one another or separated by circular convolutions or portions of convolutions. In this connection it is to be considered that the corners formed at the ends of the chords are of importance too in the creation of the locking effect. The corners 15 and 16 of one chord as in Fig. 2, located on the outer periphery of the coil will have, in many instances, a sufficient tendency of digging into the material of the tapped member when the radial pressure of a screw bolt bears on the mid-length of the chord formation. However, this effect is much stronger when a corner is formed between two adjoining chords, as such a corner will be sharper than one between a chord and an arc of the coil. Furthermore, with two adjoining chords there is a similar effect to that of the spreading of a wishbone when a screw exerts an outwardly directed radial pressure on two adjacent chords. This pressure tends not only to deform the chords but also to spread elastically the angle between the chords. Thus the wishbone effect, which is not present where e. g. waves would be substituted for the cornered conformation, adds to the elastic locking effect of the individual chords. For this reason, the preferred form of the invention is provided with at least two adjoining chords. The number of adjacent chords may extend through between a portion of one convolution and a plurality of convolutions. An insert, in which self locking convolutions are a multiple of turns successively formed adjacent to each other, might be required for high torque applications or where it is found necessary to decrease stress on the wire by distributing the locking effect over a multiple number of gripping convolutions. In an insert, in which the gripping convolutions are separated by one or more circular convolutions, the locking effect will be distributed over the length of the insert. This will prove very beneficial where long length inserts are specified, since a single gripping convolution tends to produce a pivotal effect, which might not be desirable. Finally, an insert in which the gripping chords are successively formed throughout several convolutions of the insert, will provide a locking effect of increasing magnitude as the depth of pentration of the bolt or male member increases when screwed into the insert.

Fig. 3 is the bottom plan view of an insert 20 with tang 21. This insert has a plurality of chords 22 adjoining each other so as to form a hexagonal angular configuration which corresponds to one of the preferred forms with adjacent chords and corners as mentioned hereinbefore. It will be noted that all the outer corners 23 are located on diameters equal to that of the circular convolutions. However, it will be understood that it is not absolutely necessary to have these corners so located in the free insert before it is contracted to line a tapped hole, but once the insert is in position in the inner thread of a nut or boss member, the corners at the chord ends must be in contact with the thread groove of such inner thread so that they cannot be dislocated by the action of an engaging bolt. The foregoing is true whether there is only one chord as in Fig. 1, or as in a preferred form, a plurality of chords such as shown in Figs. 3 to 5.

Fig. 4 is the side elevation of an example of a self-locking coil 30 having a chord 31 similar to the chord 14 in Figs. 1 and 2, and a second chord 32 separated from the first one by circular convolutions 33. However, it will be understood from what has been stated hereinbefore that it is preferred to have at least two adjoining chords instead of each of the single chords.

The coil 40 illustrated in Fig. 5 is similar to the coil of Fig. 3 with the difference, however, that there is a leading end convolution 41 of triangular shape rather than a diametrical tang 21. It will be noted that the inner area 42 of the triangle 41 is smaller and inside of the area 43 bordered by the chords forming the angular configuration 44. The triangular end convolution 41 serves as a grip end for an inserting tool of triangular cross-section which can be introduced from the opposite end of the insert through the angular convolution 44 and engages the grip end triangle so as to contract the coil while it is screwed into the tapped hole of a nut or boss for which it is intended.

It has been stated that the length of a chord portion in the convolutions of a given insert must not exceed a certain maximum. This condition prevails as a chord portion of excessive length, owing to its relative closeness to the coil axis, would prevent the passage of a bolt. Now I have found that a certain relationship exists between the length of a chord and the pitch and nominal diameter of an insert, which will always assure the passage of a standard bolt. Taking as an example inserts as specified in the U. S. Military Standards developed cooperatively with the Society of Automotive Engineers, such inserts are made of wire of substantially diamond-shaped wire cross-section, i. e., a cross-section which is symmetrical with respect to a line extending in the direction of a radius of the coiled wire, and which is symmetrical too with respect to a line at right angles to the radial direction. Considering now Fig. 6, diagrammatically illustrating in an end view such a standard insert 50 of a wire thickness W and with a chord 51 extending between the points A and B on the outer circumference of the insert, the inner distance of the chord from the center O be $\overline{OC}$ and the central angle of the chord be $\alpha$ then $$\cos \frac{\alpha}{2} = \frac{\overline{OC} + W}{\overline{OA}}$$

Now $\overline{OC}$ is one half the minor diameter $D_1$ of the screw to be screwed into the insert minus a factor $k$, and $\overline{OA}$ is one half the major diameter $D_2$ of the tapped hole. Hence, $$\cos \frac{\alpha}{2} = \frac{D_1 + 2W - 2k}{D_2}$$

I have found by trial that the value of $k$ for the mentioned standard inserts is about $.454\ p + .015$, wherein $p$ is the pitch of the screw thread. With these values, the maximum admissible central angle of a chord can be calculated by using the formula $$\alpha = 2 \cos^{-1}\left[\frac{D_1 + 2W - 2(.454p + .015)}{D_2}\right]$$

This maximum value of the central angle must not be exceeded for any one of the chords occurring in an insert. On the other hand, the length of a chord should not be substantially smaller than stated if best results are to be obtained, because a decrease of the angle included by adjacent chords is favorable from the view point of the mentioned corner effect, and such a decrease takes place as the length of the adjacent chords increases.

It will be apparent to those skilled in the art that many alterations and modifications of the structure shown and described may be made without departure from the essence and spirit of the invention which for that reason shall not be limited but by the scope of the appended claims.

I claim:

1. A screw thread insert adapted to line a tapped hole in a boss or nut and to receive a screw threaded bolt in its interior, said insert forming a substantially cylindrical body of a helically coiled wire of a substantially diamond shaped cros-section with its longer axis intersecting the axis of said cylindrical body so as to provide inner and outer screw thread forming portions, said body having, prior to its insertion into said tapped hole, an outer diameter slightly larger than the major diameter of said tapped hole, one end of the insert being shaped as a grip to be engaged by an inserting tool from the inside of said insert, at least one convolution of the insert located intermediate and at substantial distances from both insert ends formed of at least three straight lined chords of the helix of the coiled wire, the ends of said chords forming with each other and the adjacent wire portions small filleted corners located on diameters substantially of the same length as that of the cylindrical insert body prior to its insertion so that said corners will tend to bite into the material of said boss or nut after the insertion, said grip end adjoining a reduced convolution arc of said body, and any corner formed by said grip end being located on a diameter smaller than that on which said chord corners are located.

2. A screw thread insert as claimed in claim 1 wherein the shape of the wire cros-section is symmetrical in respect of a line in the direction of a radius of the coiled wire and in respect to a line at right angles to said radial line, the magnitude of the central angle of each of said chords substantially being $$\alpha = 2\cos^{-1}\left[\frac{D_1 + 2W - (.454p + .015)}{D_2}\right]$$

wherein $D_1$ is the minor diameter of the screw fitting into the insert, $W$ is the width of the wire in said radial direction, $p$ is the pitch of the screw thread, and $D_2$ is the major diameter of the tapped hole for which said insert is destined.

References Cited in the file of this patent

UNITED STATES PATENTS

| | | |
|---|---|---|
| 2,275,993 | Robertson | Mar. 10, 1942 |
| 2,363,662 | Findley | Nov. 28, 1944 |
| 2,363,663 | Findley | Nov. 28, 1944 |
| 2,381,206 | Clayson | Aug. 7, 1945 |
| 2,402,159 | Hattan | June 18, 1946 |
| 2,755,699 | Forster | July 24, 1956 |

FOREIGN PATENTS

| | | |
|---|---|---|
| 393,675 | Great Britain | June 15, 1933 |